United States Patent [19]

Eichelberger et al.

[11] 3,890,500

[45] June 17, 1975

[54] APPARATUS FOR SENSING RADIATION AND PROVIDING ELECTRICAL READOUT

[75] Inventors: Charles W. Eichelberger, Schenectady; William E. Engeler, Scotia; Jerome J. Tiemann, Schenectady, all of N.Y.

[73] Assignee: General Electric Company, Schenetady, N.Y.

[22] Filed: Feb. 11, 1974

[21] Appl. No.: 441,054

[52] U.S. Cl. ................................ 250/211 J; 357/31

[51] Int. Cl. ........................................... H01j 39/12

[58] Field of Search ............ 250/211 R, 211 J, 578; 317/235 N; 340/173 R, 173 LS, 173 CR; 328/123, 174; 303/308, 311, 319; 357/3

[56] References Cited

UNITED STATES PATENTS

| | | | |
|---|---|---|---|
| 3,697,786 | 10/1972 | Smith | 317/235 N |
| 3,715,485 | 2/1973 | Weimer | 250/211 J |
| 3,763,480 | 10/1973 | Weimer | 340/173 R |
| 3,801,820 | 4/1974 | Eichelberger | 340/173 LS |

*Primary Examiner*—James W. Lawrence
*Assistant Examiner*—D. C. Nelms
*Attorney, Agent, or Firm*—Julius J. Zaskalicky; Joseph T. Cohen; Jerome C. Squillaro

[57] ABSTRACT

An array of radiation sensing devices each including a pair of closely coupled conductor- insulator-semiconductor cells, one a row line connected cell and the other a column line connected cell, is provided on a common semiconductor substrate connected to ground. Read out of a device is accomplished by reducing the voltage on the row line of the device to cause stored charge to flow to the column connected cell of the device and thereafter reducing the voltage on the column line of the device to inject the charge stored therein into the substrate. Circuit means is provided in series relationship with the addressed column line to integrate the current flow in the column line due to the injected charge. In another embodiment the column conductor lines are arranged in a plurality of consecutively numbered sets, each set including the same number of consecutively numbered column lines. A plurality of charge integrating means are provided each connected between a respective column line of a set and ground for simultaneous read out of charges through the column lines of a set. Switch means are provided for connecting each set of column lines in turn for read out. A plurality of video signals equal in number to the number of sets are obtained. The video signals may be multiplexed to obtain a composite video signal.

17 Claims, 43 Drawing Figures

APPARATUS FOR SENSING RADIATION AND PROVIDING ELECTRICAL READOUT

The present invention relates in general to apparatus including devices and circuits therefor for sensing radiation and developing electrical signals in accordance therewith. The present invention relates in particular to such apparatus which senses and stores charge produced by electromagnetic radiation flux and which provides an electrical readout of the stored charge.

This application relates to improvements in the apparatus of copending patent application Ser. No. 264,804 filed June 21, 1972, now U.S. Pat. No. 3,805,062, and assigned to the assignee of the present application, which application is incorporated herein by reference.

The radiation sensing apparatus specifically disclosed in the aforementioned patent application comprises a substrate of semiconductor material of one conductivity type having a plurality of storage sites arranged in a plurality of rows and columns for storage of radiation generated minority carriers therein. Each of the storage sites includes a row oriented conductor-insulator-semiconductor capacitive cell and a closely coupled column oriented conductor-insulator-semiconductor capacitive cell. Each of the row-oriented conducting members or plates of a row of sites are connected to a respective row conductor line. Each of the column-oriented conducting members or plates of a column of sites are connected to a respective column conductor line. Switching means are provided for periodically connecting and disconnecting the substrate from ground or point of reference potential. Means are provided for charging the row and column conductor lines to predetermined potentials in relation to the potential of the point of reference potential to establish depletion regions in the substrate underlying each of the first and second conductive plates with the depletion regions underlying adjacent first and second conductive plates being coupled. Selective read out of charge stored in a row of sites is accomplished by changing the potential on the row line to cause flow of charge stored in the row-oriented storage cells thereof into the column-oriented storage cells thereof. The read out of charge stored in column-oriented cells is accomplished by changing the potential on each of the column lines in sequence to cause injection of carriers stored therein into the substrate in sequence and concurrently disconnecting the substrate from ground or reference potential during each such injection of carriers. Each such injection produces a respective current flow in circuit with the substrate which is sensed across an integrating capacitance which includes the inherent capacitance of the conductor lines and conducting members connected thereto in relation to the substrate. Means are provided for periodically sampling the variation in voltage developed on the integrating capacitance to provide an electrical output varying in time in accordance with the variation in amplitude of the samples.

As the number of storage sites in an array is increased the total inherent capacitance of the substrate in relation to ground or a point of reference potential increases and hence the signal voltage developed across the capacitance decreases. As a result, in arrays having a large number of pairs of storage cells the signal level can become quite small. In addition, as the photon generated currents from the conductor-insulator-semiconductor capacitive cells other than the selected site pass through the integrating capacitance when not bypassed by the switching means, the aggregate photon generated current which flows may exceed the current from the selected site and accordingly mask the desired signal. Even when the injection current exceeds the photon generated current flowing due to creation of photon generated electron-hole pairs at the sites other than the one being read out, such photon generated current introduces noise into the signal current and hence introduces noise into the voltage appearing across the integrating capacitance. In arrays such as described with the substrate periodically disconnected from ground or reference potential, circuits for the operation of the array included on the same substrate as the array must be isolated to avoid introduction of extraneous noise into the sensed signal. In addition in a system in which injected charge is read out through the substrate only a single device of the array may be read out at a time with consequent limitation on size and speed of operation of the array.

The present invention is directed to overcoming problems such as outlined above in radiation responsive apparatus of the kind described above.

Accordingly, an object of the present invention is to provide improved surface charge storage devices and methods of operating such devices.

Another object of the present invention is to provide arrays of radiation sensing elements of the kind described above which include very large numbers of sensing elements with minimum degradation of the output signal therefrom.

Another object of the present invention is to provide arrays of sensing elements of the kind described above in which a plurality of devices may be simultaneously addressed for readout and correspondingly a plurality of video signals obtained simultaneously therefrom.

In carrying out the invention in one illustrative embodiment thereof there is provided a substrate of semiconductor material of one conductivity type having a major surface. A plurality of first conductive plates are provided, each overlying and in insulated relationship to the major surface and forming a first conductor-insulator-semiconductor capacitor with the substrate. A plurality of second conductive plates are provided, each adjacent a respective first conductive plate to form a plurality of pairs of plates, the pairs of plates being arranged in a matrix of rows and columns, each of the second conductive plates overlying and in insulated relationship to the major surface and forming a second conductor-insulator-semiconductor capacitor with the substrate. Each second conductor-insulator-semiconductor capacitor is coupled to a respective first conductor-insulator-semiconductor capacitor so as to permit the transfer of surface charge between them. A plurality of column conductor lines are provided, the second conductive plates in each of the columns are connected to a respective column conductor line. A plurality of row conductor lines are provided, the first conductive plates in each of the rows are connected to a respective row conductor line. A first voltage means provides a first voltage between the row conductor lines and the substrate to deplete respective first portions of the substrate lying thereunder of majority charge carriers. A second voltage means connected in circuit between the column conductor lines and the substrate provides a second voltage between said column conductor lines and the substrate to deplete respective second portions of the substrate lying thereunder of majority charge carriers. The substrate is maintained at a fixed potential in relation to the second voltage means. A first means is provided for collapsing and reestablishing the first voltage on each of the row conductor lines in sequence during a respective first period of time. A second means is provided for collapsing and reestablishing the second voltage on each of the column conductor lines in sequence during a respective second period of time shorter than the first period of time, each of the second periods includes within the first period. A charge integrating means is connected in sequence between each of the column conductor lines and the second voltage means during a respective second period for time integrating each of the current flows produced therein by injection of charges into the substrate. The time integrated outputs may be arranged in sequence to obtain a video signal.

In another illustrative embodiment of the invention the column conductor lines are arranged in a plurality of consecutively numbered sets, each set including the same number of consecutively number lines. A plurality of consecutively numbered terminals are provided equal in number to the number of set. Each column line is connected through a respective switch to a correspondingly numbered terminal. A shift register is provided for actuating the switches of each set during a respective second period of time whereby the column lines of each set are connected in turn to the terminals. A plurality of circuit means are provided each connected between a respective terminal and the substrate including means for collapsing and reestablishing the voltage on the terminals during the second periods of time, whereby charges stored in each set of second semiconductor capacitors are simultaneously injected into the substrate in sequence and corresponding currents are caused to flow simultaneously in each of said circuit means. Each of the circuit means includes means for time integrating the current flows. Thus a plurality of simultaneous video signals are obtained, equal in number to the number of lines in a set. The video signals may be multiplexed to obtain a composite video signal. With the devices associated with the first lines of each set adapted to sense radiation of a first color and devices associated with the second lines of each set adapted to sense radiation of a second color, and so on, a plurality of simultaneous color signals may be obtained.

The novel features which are believed to be characteristic of the present invention are set forth with particularity in the appended claims. The invention itself, both as to its organization and method of operation, together with further objects and advantages thereof may best be understood by reference to the following description taken in connection with the accompanying drawings wherein:

Figure 1A:
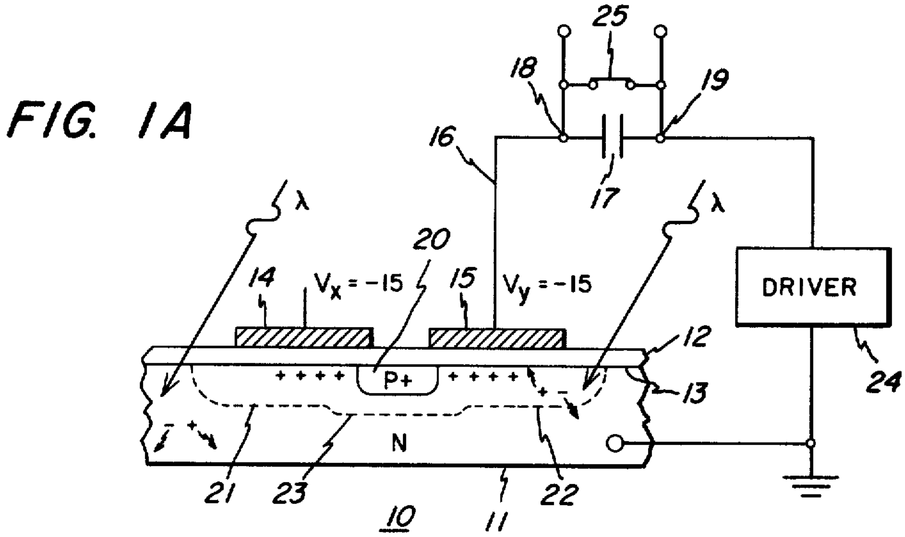
FIGS. 1A–1D show diagrams of pairs of conductor-insulator-semiconductor cells of a radiation sensing device connected in circuit and illustrating various stages in the operation thereof in accordance with the present invention.

Reference is now made to FIGS. 1A, 1B, 1C and 1D wich show a pair of coupled sensing cells particularly suitable for operation in two dimensional arrays. FIG. 1A shows a device 10 including a substrate 11 of N-type conductivity semiconductor material, an insulating member 12 overlying the major surface 13 of the substrate, and a pair of conductive members or plates 14 and 15 overlying the insulating member. Plates 14 and 15 are closely spaced and the substrate underlying the space between the plates is provided with a P-type conductivity region 20 so as to permit transfer of surface charge in the substrate underlying the plates. Alternatively other means such as disclosed in the aforementioned U.S. Pat. No. 3,805,062, may be provided for coupling surface charge in the substrate between the plates. The substrate 11 is connected to ground or to a point of fixed reference potential. Plate 14 is adapted to be connected to a row conductor line of an array consisting of rows and columns of radiation sensing devices. Plate 15 is adapted to be connected to a column conductor line 16 of the array. An intergrating capacitance 17 having a pair of electrodes or terminals 18 and 19 is provided. Electrode 18 is connected to column line 16 and electrode 19 is connected to one terminal of column line driver 24, the other terminal of which is connected to ground. A reset switch 25 is connected across the electrodes of the capacitor 17. Output is derived across the electrodes 18 and 19 of the capacitor.

Figure 1B:
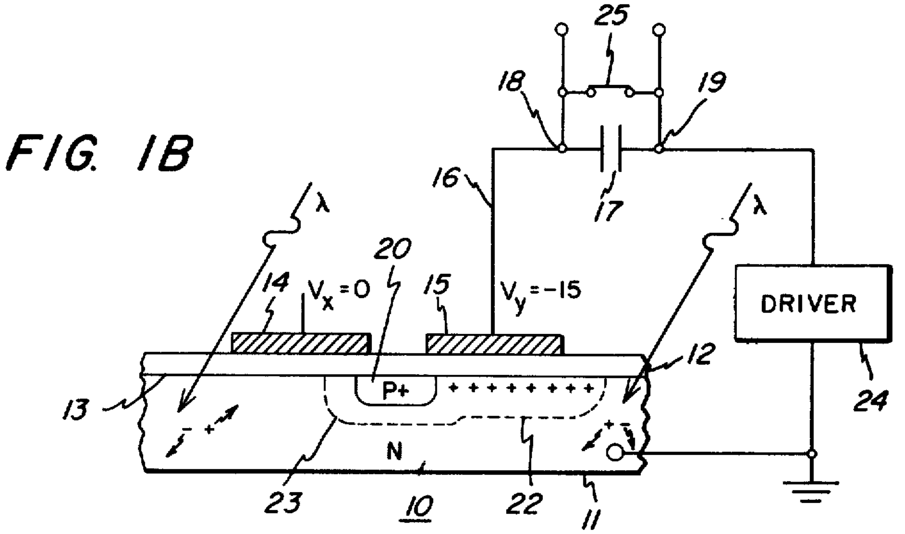
Figure 1C:
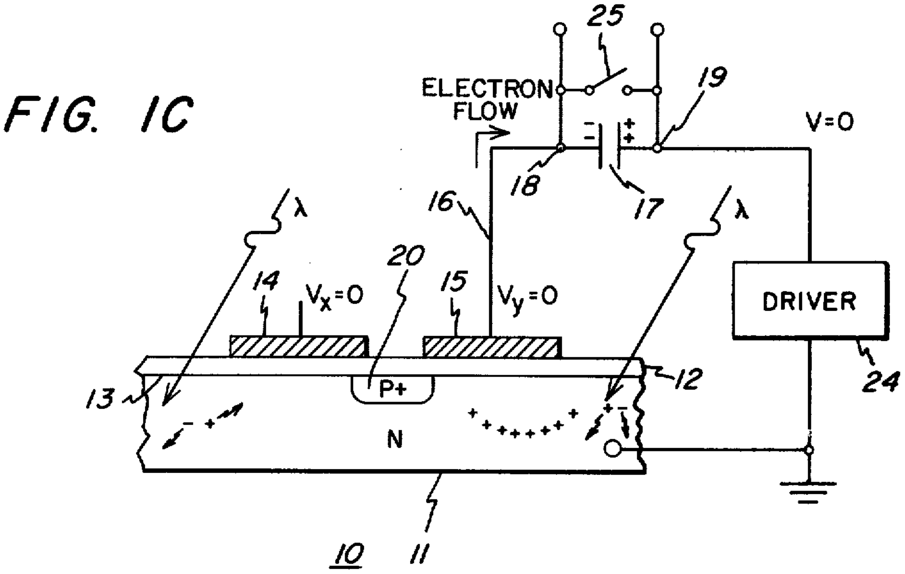

When potentials of appropriate polarity with respect to the substrate and appropriate magnitude, for example the −15 volts indicated in FIG. 1A, are applied to the plates 14 and 15, a pair of depletion regions 21 and 22 are formed which are connected together by the high conductivity P-type region 20 which also has a depletion region 23 associated with it. Accordingly, charge stored in one of the depletion regions under either of the plates 14 and 15 may readily flow to the other depletion region through the P-type conductivity region 20. Radiation flux entering the depletion regions causes the generation of minority carriers which are stored at the surface of the depletion regions. FIG. 1B shows the condition of the device when the voltage on plate 14 is set at zero to collapse the depletion region 21 thereof and cause the charge that was stored therein to flow or transfer into the depletion region 22 underlying the plate 15. To read out or sense the charge that has been stored in the depletion region 22, the reset switch 25 is opened and the potential on the plate 15 is collapsed or reduced in magnitude to a suitable value, such as zero, by column line driver 24. Such action causes the carriers stored in the depletion region 22 to be injected into the substrate and produce a current flow into the plate 15 (electron flow from the plate) as shown in FIG. 1C.

Figure 1D:
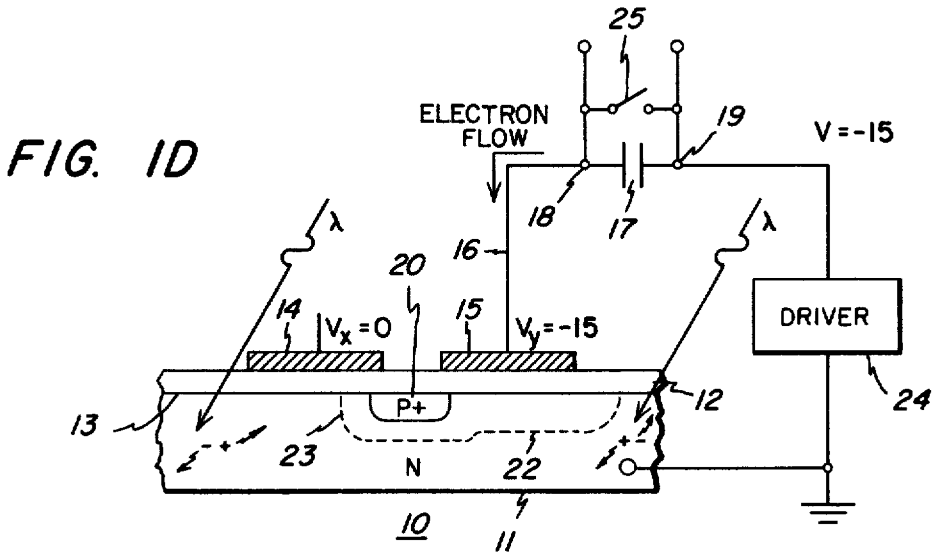

The increase in potential of the plate 15 from a negative value to a zero value causes a reduction in the electric field that maintained the charge in the surface inversion layer and causes the minority carriers stored in the inversion layer to be injected into the substrate. The injection of minority carriers is indicated in FIG. 1C by the distribution of positive charge throughout the substrate 11. Such injection causes a neutralizing negative charge to flow into the substrate, i.e. a conventional current to flow out of the substrate and into the plate 15. The current flow into the plate 15 charges the integrating capacitor 17 to a value dependent on the injected charge. The minority carriers injected into the substrate eventually diffuse or recombine therein. Reestablishment of the depletion region for another cycle of operation should await disappearance of such minority carriers from the region 22, otherwise the stored charge would be reaccumulated or recollected on reestablishment of depletion in the region 22. The potential on plate 15 is returned to its original value prior to closing of the reset switch 25 and subsequent to the time during which the injected minority carriers have disappeared from the region 22, as shown in FIG. 1D. The current flow into the plate 15 substracts from the current flow out of the plate 15 and results in a net voltage across the capacitor 17 corresponding to the stored charge removed from the device. Samples may be taken of the voltage on the integrating capacitor 17 resulting from successive cycles of operation of the device to provide a video signal which represents the integrated values of the radiation falling on the device during successive cycles of operation.

Figure 2A:
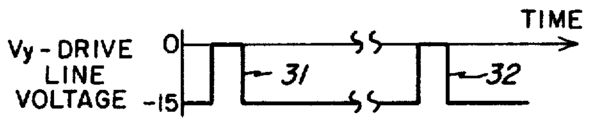
FIGS. 2A–2C are graphs of various voltage and current signals appearing in the diagrams of FIGS. 1A–1D useful in explaining the operation thereof.
Figure 2B:
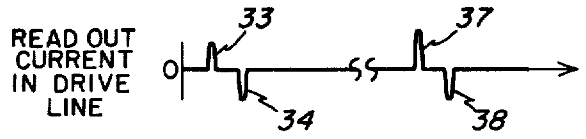
Figure 2C:
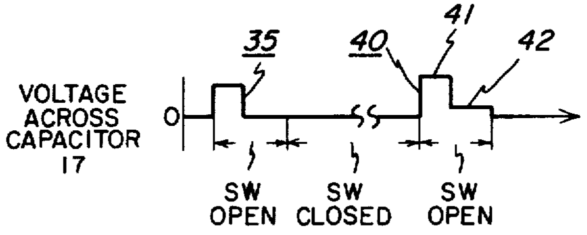

Reference is now made to FIGS. 2A, 2B and 2C which show, respectively, graphs of column oriented plate drive voltage $V_y$, read out current, and integrating capacitor voltage drawn to a common time scale for the device shown in FIGS. 1A, 1B, 1C and 1D for two different conditions of charge storage in the cells of the device, one in which no radiation produced charge has been stored and the other in which charge has been stored in response to radiation. It is assumed that the voltage $V_x$ of the row oriented plate has been reduced to zero. FIG. 2A shows identical pulses 31 and 32 of drive voltage from driver 24 applied to the plate 15 in different cycles of operation. FIG. 2B shows the currents which flow in the external circuit between plate 15 and the substrate in response to the application of such pulses. FIG. 2C shows the voltage developed across the capacitor 17 due to the current flows shown in FIG. 2B. FIG. 2C also shows the periods of time during which the reset switch 25 is open and periods of time during which it is closed. The first pair of current pulses 33 and 34 shown in FIG. 2B represent a condition in which no radiation has been received and hence no charge stored in the column oriented cell of the device 10. During the change of voltage from a minus 15 volt level to ground level, the charge used to establish the depletion region 22 flows out of the plate 15 and appears as the positive going pulse 33. After the read out period the voltage on the plate is returned to its minus 15 volt level and produces charge flow, represented by a current pulse 34 to establish the initial depletion region under the plate 15 and is equal to the current pulse 33. Accordingly, a voltage pulse 35 is developed across capacitor which is essentially identical in form except for its amplitude to pulse 31. The net voltage output at the end of the integration operation is zero as shown in FIG. 2C.

Attention is now directed to pulses 37 and 38 produced in response to application of pulse 32 to the column oriented cell. The positive pulse 37 of large amplitude represents the charge stored in the depletion region 22 in response to radiation as well as some of the charge which flowed into the plate to establish the depletion region. The negative pulse 38 of small amplitude represents current which flowed into the plate to establish the initial depletion region therein. Integration of pulses 37 and 38 in capacitor 17 produces a pulse 40 of the form shown. Initially, the voltage across the capacitor 17 rises to a large amplitude or level 41 due to the first pulse 37 of current and upon occurrence of the second pulse 38 of current the voltage on the capacitor drops to a second level 42, conveniently referred to as the back porch of the pulse. The second level 42 represents a voltage corresponding to the charge stored in the invention layer of region 22. Note that the reset switch 25 is open during the sampling interval, i.e. during the occurrence of the voltage pulses of FIG. 2C of each cycle of operation of the sensing device and remains closed during the remainder of the cycle during which storage of charge is occurring in the device in response to incident radiation. Successive cycles of operation of the device in circuit would produce successive voltage pulses such as pulse 40, the back porch level 42 of which varies in accordance with the radiation incident on the device during the storage period. Sampling the back porch level of the successive voltage pulses would provide a signal representing the variation of radiation incident on the device as a function of time.

Figure 3:
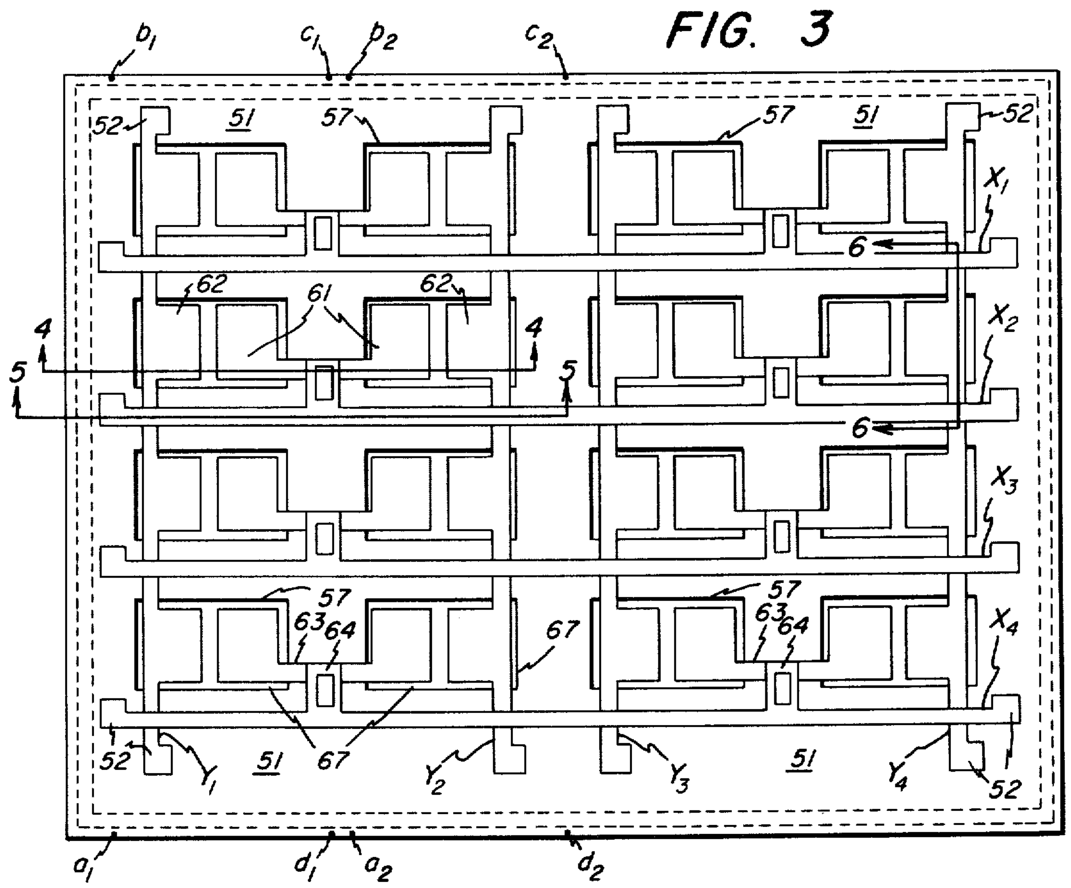
FIG. 3 is a plan view of an array or assembly of a plurality of radiation responsive cells such as shown in FIG. 1A–1D formed on a common semiconductor substrate.
Figure 4:
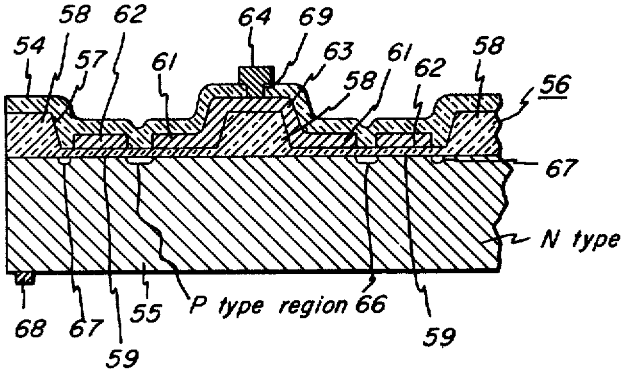
FIG. 4 is a sectional view of the assembly of FIG. 3 taken along section lines 4—4 of FIG. 3.
Figure 6:
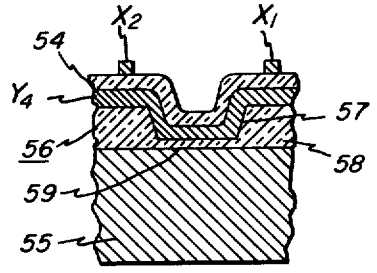
FIG. 6 is a sectional view of the assembly of FIG. 3 taken along section lines 6—6 of FIG. 3.
Figure 5:
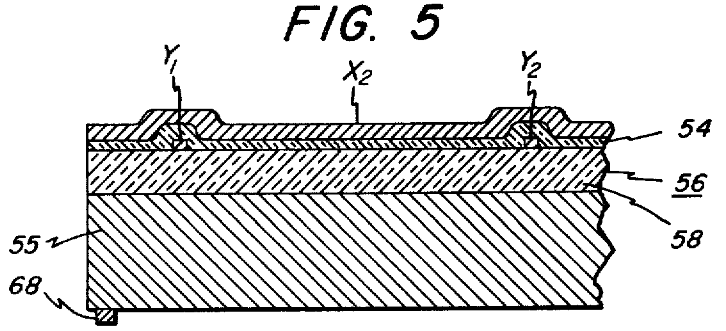
FIG. 5 is a sectional view of the assembly of FIG. 3 taken along section lines 5—5 of FIG. 3.

Before proceeding to describe the radiation sensing apparatus of FIG. 7 embodying the present invention the radiation sensing array used in the apparatus will be described. While a specific form of the array fabricated using a specific technology is shown and described, it will be understood that the array utilized in the apparatus may take on other forms and that any of the commonly used technologies for surface charge transfer devices may be used in the fabrication thereof. Reference is now made to FIGS. 3, 4, 5 and 6 which show an image sensing array 50 of radiation sensing devices 51, such as device 10 described in FIGS. 1A, 1B and 1C, arranged in four rows and columns. The array includes four row conductor lines, each connecting the row-oriented plates of a respective row of devices, and are designated from top to bottom $X_1$, $X_2$, $X_3$ and $X_4$. The array also includes four column conductor lines, each connecting the column-oriented plates of a respective column of devices, and are designated from left to right $Y_1$, $Y_2$, $Y_3$ and $Y_4$. Conductive connections are made to lines through conductive landings or contact tabs 52 provided at each end of each of the lines. While in FIG. 3 the row conductor lines appear to cross the column conductor lines, the row conductor lines are insulated from the column lines by a layer 54 of transparent glass as is readily apparent in FIGS. 4, 5 and 6. In FIG. 3 the outline of the structure underlying the glass layer 54 is shown in solid outline for reasons of clarity.

The array includes a substrate or wafers 55 of semiconductor material of N-type conductivity over which is provided an insulating layer 56 contacting a major face of the substrate 55. A plurality of deep recesses 57 are provided in the insulating layer, each for a respective device 51. Accordingly, the insulating layer 56 is provided with thick or ridge portions 58 surrounding a plurality of thin portions 59 in the bottom of the recesses. On the bottom or base of each recess are situated a pair of substantially identical conductive plates or conductive members 61 and 62 of rectangular outline. Plate 61 is denoted a row-oriented plate and plate 62 is denoted a column oriented plate. The plates 61 and 62 of a device 51 are spaced close to one another along the direction of a row and with adjacent edges substantially parallel. In proceeding from the left hand portion of the array to the right hand portion, the row-oriented plates 61 alternate in lateral position with respect to the column oriented plates 62. Accordingly, the row-oriented plates 61 of pairs of adjacent devices of a row are adjacent and are connected together by a conductor 63 formed integral with the formation of the plates 62. With such an arrangement a single connection 64 from a row conductor line through a hole 69 in the aforementioned glass layer 54 is made to the conductor 63 connecting a pair of row-oriented plates. The column-oriented lines are formed integrally with the formation of the column-oriented plates 62. The surface adjacent portion of the substrates 55 underlying the space between the plates 61 and 62 of each device 81 is provided with a P-type conductivity region 66 corresponding to the P-type conductivity region 20 of FIG. 1A. Region 67 in the substrate is also of P-type conductivity and is formed concurrently with the formation of P-type region 66 in accordance with the diffusion technique for the formation thereof in which the plates 61 and 62 are used as diffusion masks. The glass layer 54 overlies the thick portion 58 and thin portion 59 of the insulating layer 56 and the plates 61 and 62, conductors 63 and column-oriented conductor lines $Y_1$–$Y_4$ thereof except for the contact tabs 52 thereof. The glass layer 54 may contain an acceptor activator and may be utilized in the formation of the P-type regions 66 and 67. A ring shaped electrode 68 is provided on the major surface of the substrate opposite the major surface on which the devices 52 were formed. Such a connection to the substrate permits rear face as well as front face interception of radiation from an object to the sensed.

The image sensing array 50 and the devices 51 of which they are comprised may be fabricated using a variety of materials and in variety of sizes in accordance with established techniques for fabricating integrated circuits as described in the aforementioned patent application Ser. NO. 264,804.

Figure 7:
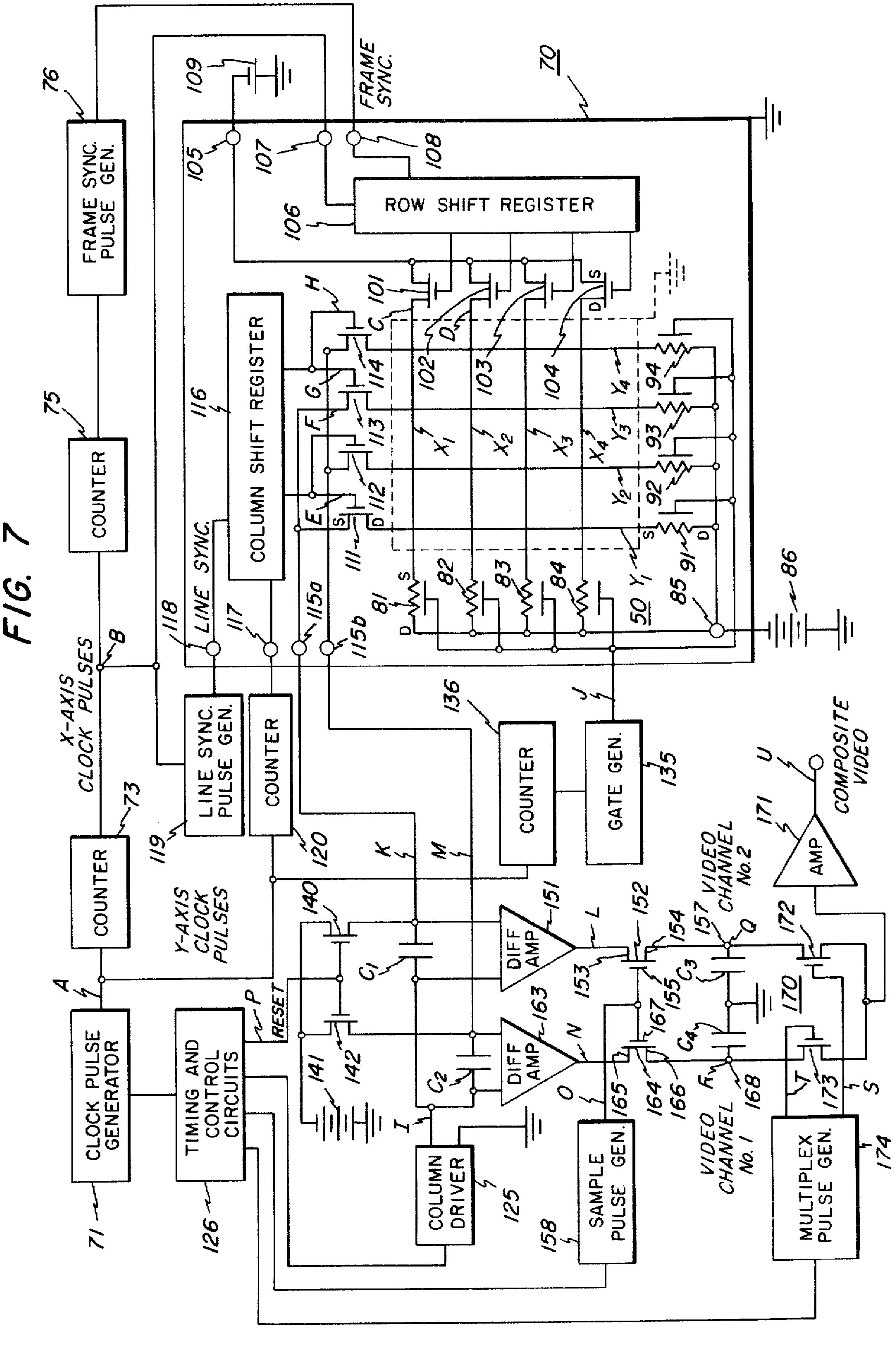
FIG. 7 is a block diagram of a system in accordance with the present invention including the image sensing array of FIGS. 3–6.

Referring now to FIG. 7, there is shown a block diagram of radiation detection apparatus or system including the image sensing array 50 of FIG. 3 which provides a video signal in response to radiation imaged on the array by a lens system (not shown), for example. The video signal may by applied to a suitable display device (not shown) such as a cathode ray tube as described in the above-referenced patent application Ser. No. 264,804 along with sweep voltages synchronized with the scanning of the array to convert the video signal into a visual display of the image.

Figure 8A:
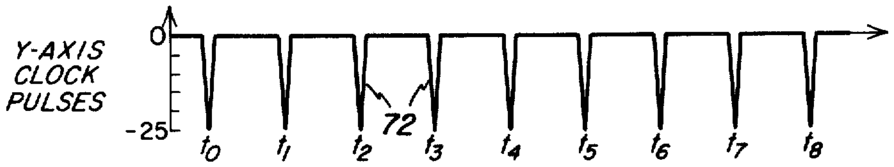
FIGS. 8A through 8U are diagrams of amplitude versus time drawn to a common time scale of signals occurring at various points in the system of FIG. 7. The point of occurrence of a signal of FIGS. 8A–8U in the block diagram of FIG. 7 is identified in FIG. 7 by a literal designation corresponding to the literal designation of the figure.
Figure 8B:
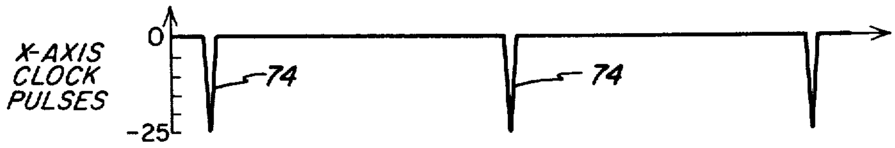
Figure 8C:
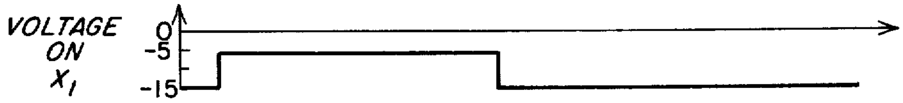
Figure 8D:
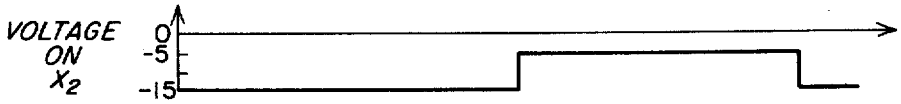
Figure 8E:
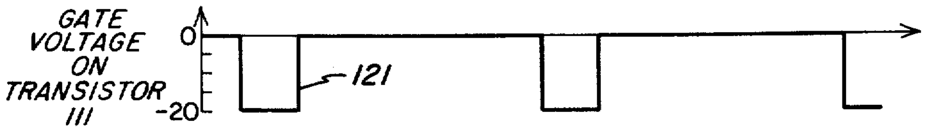
Figure 8F:
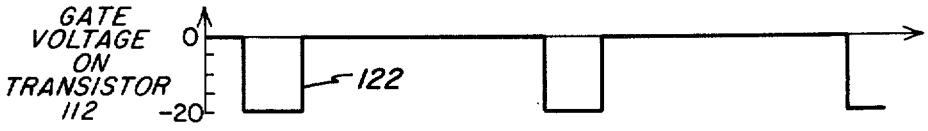
Figure 8G:
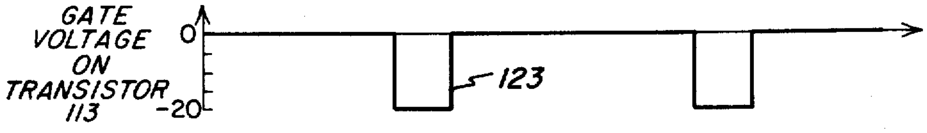
Figure 8H:
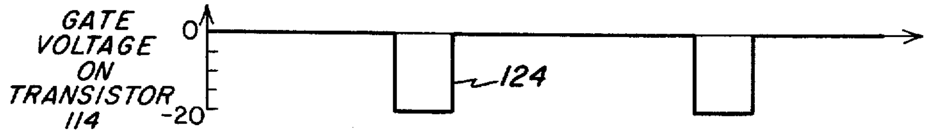
Figure 8I:
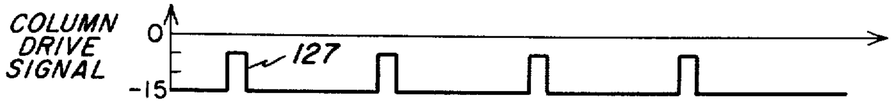

The system will be described in connection with FIGS. 8A–8U which show diagrams of amplitude versus time drawn to a common time scale of signals occurring at various points in the system of FIG. 7. The point of occurrence of a signal of FIGS. 8A–8U is referenced in FIG. 7 by a literal designation corresponding to the literal designation of the figure reference. The amplitudes of the signals of FIGS. 8A–8U are not drawn to a common voltage or current scale for reasons of clarity in explaining the operation of the system in accordance with the present invention.

The system includes a clock pulse generator 71 which develops a series of regularly occurring Y-axis pulses 72 of short duration shown in FIG. 8A, occurring in sequence at instants of time $t_1$–$t_8$ and representing a half scanning cycle of operation of the array. The output of the clock pulse generator 71 is applied to a first counter 73 which divides the count of the clock pulse generator by four to derive X-axis clock pulses 74, such as shown in FIG. 8B. The output of the first counter 73 is also applied to a second counter 75 which further divides the count applied to it by four to provide frame synchronizing pulses to the frame sync generator 76.

The sensing array 50, which is identical to the image sensing array of FIG. 3 and is identically designated, includes row conductor lines $X_1$ thru $X_4$ and column conductor lines $Y_1$ thru $Y_4$. The drive circuits for the row conductor lines $X_1$–$X_4$ and for the column conductor lines $Y_1$–$Y_4$ of array 50 are included on the same substrate 70 which is grounded as the array to minimize the number of external connections which are required to be made for utilizing the array 50 in the system. A plurality of row line analog switches 81–84, in the form of MOSFET transistor devices, each having a source electrode, a drain electrode and a gate electrode, are provided. Each of the sources of devices 81–84 is connected to one end of a respective one of the row conductor lines $X_1$–$X_4$ and each of the drain of the devices 81–84 is connected to a row line bias terminal 85. Terminal 85 is connected to the negative terminal of a −15 volt source 86, the positive terminal of which is connected to ground. Similarly, a plurality of column line analog switches 91–94 in the form of MOSFET devices, each having a source electrode, a drain electrode and a gate electrode, is provided. Each of the sources of the devices 91–94 is connected to one end of a respective one of column conductor lines $Y_1$–$Y_4$ and each of the drains of the devices 91–94 connected to bias terminal 85. The MOSFET transistors 81–84 and 91–94 are P-channel devices. Accordingly, when the gate electrode of such a device is appropriately negatively biased with respect to the source electrodes a low resistance is provided between source and drain, and conversely in the absence of such bias a high resistance is presented between the source and drain. Gating of the other ends of the row conductor lines $X_1$–$X_4$ is provided by a plurality of MOSFET transistors 101–104 formed integrally on the substrate 70, each having a drain electrode connected to the other end of a respective one of the row conductor lines $X_1$–$X_4$ and each having a source electrode connected to a row line biasing contact 105 which in the operation in the system is connected to the negative terminal of a −5 volt source 109 the positive terminal of which is connected to ground. Each of the gate electrodes of the transistors 101–104 is driven by a respective drive signal derived from the row shift register 106. The row shift register 106 may be any of a number of shift registers known to the art. The elements of the shift register 106 may be concurrently formed on the substrate at the same time that the devices of the image sensing array 50 are formed.

The shift register 106 is provided with a terminal 107 to which is applied a train of vertical scanning rate clock or X-axis pulses 74, such as shown in FIG. 8B, the recurrence rate of which is one-fourth the recurrence rate of the X-axis clock pulses. Frame synchronizing pulses derived from counter 75 are applied to frame sync pulse generator 76 to develop an output which is applied to frame synchronizing terminal 108. Each of the frame synchronizing pulses has a duration equal to substantially the sum of the periods of four cycles of Y-axis clock pulses. The frame synchronizing pulses are shifted in the shift register 106 at the X-axis clock rate to cause successive energization of the gate electrodes of the transistors 101-104 connected, respectively, to the lines $X_1$ thru $X_4$ to successively shift the pulse voltage between a =15 volt value and a =5 volt value. The wave form of the drive voltage on line $X_1$ is shown in FIG. 8C and the wave form of drive voltage on line $X_2$ is shown in FIG. 8D for one-half of a cycle of operation of the array.

Also integrally formed on the substrate 70 are a plurality of column conductor line drive MOSFET transistors 111–114. Each of the transistors 111–114 has a drain electrode connected to the other end of a respective one of column conductor line $Y_1$–$Y_4$. The source electrodes of transistors 111 and 113 are connected to line terminal 115*a*. The source electrodes of transistors 112 and 114 are connected to line terminal 115*b*. The gate electrodes of the transistors 111 and 113 are connected to a point or stage on the column shift register 116 and gate electrodes of transistors 112 and 114 are connected to a successive point or stage on the shift register 116. The column lines $Y_1$ and $Y_2$ will be referred to as a set of consecutively numbered column lines and column lines $Y_3$ and $Y_4$ will be referred to as a successive set of consecutively numbered column lines. Each of the sets have the same number of lines. Lines $Y_1$ and $Y_3$ are the first lines in their sets and lines $Y_2$ and $Y_4$ are the second lines in their sets. The column shift register 116 is provided with a input terminal 117. A divide-by-two counter 120 is connected between clock pulse generator 71 and terminal 117 to provide pulses of one half the repetition rate of Y-axis clock pulses. The column shift register 116 is also provided with a line synchronizing terminal 118 to which line synchronizing pulses are applied from line sync pulse generator 119. The line sync pulse generator is connected to the counter 73 and provides an output synchronized with X-axis clock pulses. The line sync pulses are shifted in the column shift register in response to pulses of one-half Y-axis clock pulse rate from counter 120. The wave form of the line synchronizing pulse applied to the line synchronizing terminal 118 is shown in FIG. 8E which also represents the output of the first stage of the column shift register 116. The line synchronizing pulse has a width less than the interval between a pair of Y-axis clocking pulses. At output terminal points of the column shift register 116 gating voltages 121–124 shown, respectively, in FIGS. 8E–8H are obtained and are applied respectively to transistors 111–114. The gating signals have −20 volts amplitude for the interval indicated. The gating voltages 121 and 122 applied to transistors 111 and 112 respectively are identical and similarly the gating voltages 123 and 124 applied to the transistors 113 and 114 respectively are identical.

Column line drive pulses 127 are obtained from column driver 125, the input of which is obtained for timing and control circuit block 126 and provides pulses of one-half Y-axis clock rate such as shown in FIG. 81. The output of the driver 125 is connected to the first drive line terminal 115a by integrating capacitor $C_1$ and is also connected to the second drive line terminal 115*b* by integrating capacitor $C_2$. Each of the pulses 127 are of short duration corresponding to the time during which it is desired to read out the radiation-produced charge stored in a device in a single column or in a plurality of columns as will be explained below. Such pulses cause injection of stored charge which is sensed across the intergrating capacitors. The pulses 127 are 10 volts in amplitude between the =15 and =5 volt levels. Accordingly, during the time interval from $t_0$ to $t_1$ two radiation sensing devices 51 in the uppermost row and in the first set connected to lines $Y_1$ and $Y_2$ are read out followed by the devices in the second set connected to lines $Y_3$ and $y_4$ which are read out during the time interval from $t_2$ to $t_3$.

Figure 8J:
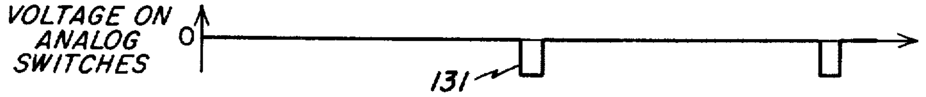

After the completion of the scanning of the devices of a row, gating pulses 131 such as shown in FIG. 8J are applied to the gates of each of the devices 81–84 and 91–94 to connected lines $X_1$–$X_4$ and $Y_1$–$Y_4$ to the souruce 86 of operating potential which establishes proper depletion producting potential on all of the plates of all of the devices 51. As shown each gating pulse 131 occurs after the column drive pulse 127 driving the last device in each row. The gating pulse occurs subsequent to the output of stage 2 of the column shift register. The duration of the gating pulses is selected to be sufficient to reestablish the −15 volt storage potential on all of the lines. The gating pulses are derived from gate generator 135 which in turn is driven by a counter 136 which provides an output pulse for every four input pulses. The counter is driven by the Y-axis clock pulses from the clock pulse generator 71.

In the operation of the system described first the column lines $Y_1$ and $Y_2$ of the first set are connected to their respective terminals 115*a* and 115*b* by a gating pulse on transistors 111 and 112 and column drive pulses are applied on the lines through respective integrating capacitors $C_1$ and $C_2$ to cause charge to be injected into the substrate and to be sensed on the integrating capacitors $C_1$ and $C_2$ in the drive line circuits. After the capacitors $C_1$ and $C_2$ have been reset, the second set of transistors 113 and 114 is gated to connect lines $Y_3$ and $Y_4$ to line terminals 115*a* and 115*b* respectively and a column drive pulse to be applied to inject stored charge into the substrate and to be sensed in capacitors $C_1$ and $C_2$.

Figure 8K:
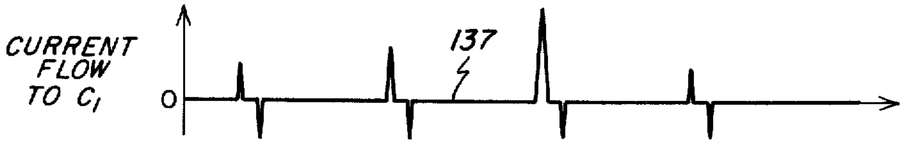
Figure 8L:
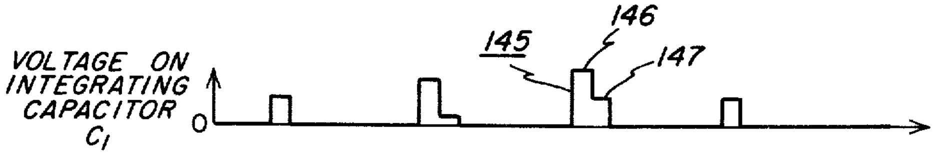
Figure 8M:

The current flow in the drive line circuit of capacitor $C_1$ in response to a sequential scanning of the devices in the first and second rows of the array is depicted in the graph 137 of FIG. 8K. In FIG. 8K are shown four pairs of current pulses corresponding respectively to the current flow in the drive line circuit of capacitor $C_1$ during the read out of the first and third devices of the first and second rows $X_1$ and $X_2$ in sequence. The first occurring pulse of each pair corresponds to current flow due to radiation produced charge and to some of the depletion producing charge stored at the instant of application of storage potential to the column-oriented plate of the device. The second occurring pulse corresponds to the aforementioned current flow resulting from the application of voltage to the column-oriented plate of the device. The first pulse of each pair occurs at the leading edge of a respective one of the column drive pulses 127 and the second pulse of each pair occurs at the lagging edge of a respective one of the column drive pulses. The first pulses are shown of various amplitudes corresponding to various magitudes of charge stored in the various devices of the first two rows. The amplitudes of the second pulses are identical as the column-oriented cells of each of the devices are identically constituted and hence would take identical charging or depletion region producing current. The pulses of FIG. 8K are integrated by capacitor $C_1$ and the pulses of FIG. 8M are integrated by capacitor $C_2$.

Figure 8N:
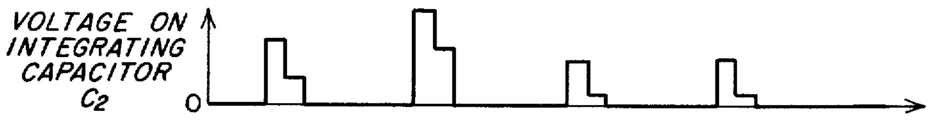
Figure 8O:
Figure 8P:
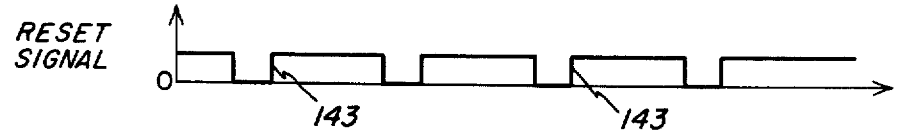

A field effect transistor 140 is provided having its source to drain circuit connected between terminal 115*a* and the negative terminal of a −15 volt source 141, the positive terminal of which is connected to ground for resetting capacitor $C_1$. Similarly another field effect transistor 142 is provided having its source to drain circuit connected between terminal 115*b* and the negative terminal of the source 141. The gates of the transistor 140 and 142 are connected to the timing and control circuits block 126 which provides reset pulses 143 as shown in FIG. 8P. The reset pulses switch from a positive voltage level to ground to turn the transistor off. The leading edge of each reset pulseis coincident with the leading edge of a respective one of column line drive pulses 127. Accordingly, except during the read out interval for the first and third devices of each row capacitor $C_1$ is shorted or bypassed to ground. Also, except during the read out interval for the second and fourth devices of each row capacitor $C_2$ is shorted or bypassed to ground. On occurrence of a column drive pulse, a pair of current pulses as mentioned above are produced which are integrated by the capacitors $C_1$ and $C_2$ and result in a corresponding two level output pulse, the first level corresponding to the charge of the first current pulse and the second level corresponding to the charge of the first current pulse less the charge of the second current pulse. The output across capacitor $C_1$ is shown in the diagram of FIG. 8L in which each of the two leveled pulses 145 having a first level 146 and a second level 147 correspond respectively to a respective pair of pulses of FIG. 8K. In the case of the first pulse and fourth pulse of FIG. 8L the second level is zero indicating that no radiation produced charge had been stored in the devices corresponding thereto. The output across capacitor $C_2$ is shown in the diagram of FIG. 8N.

The output appearing across the integrating capacitor $C_1$ is applied to a first video channel comprising a differential amplifier 151 and a sample and hold circuit to provide a first video output. The sample and hold circuit includes transistor 152 having a drain 153, a source 154 and a gate 155 and a capacitor $C_3$. The source to drain current flow path of the transistor 152 is connected between the output of the amplifier 151 and one terminal 157 of the $C_3$, the other terminal of which is connected to ground. The gate 155 is connected to the sample pulse generator 158 which is controlled by the timing and control circuits block 126 and provides the train of sampling pulses 160 shown in the graph FIG. 80. Each of the pulses 160 are of short duration and are equally spaced along the time axis of the graph. One sampling pulse occurs for every other Y-axis clock pulse. Each of the pulses 160 are phased to occur during the occurrence of the back porch or second level of the two level video pulses of FIG. 8L appearing on the integrating capacitor $C_1$. During the sampling intervals the transistor 152 is turned on so as to permit capacitor $C_3$ to charge in turn to a voltage corresponding to the voltage 158 of the second levels of the pulses 145 of FIG. 8L. Accordingly, a first video signal 161 such as shown in FIG. 80 is obtained at terminal 157 in which the signal shifts from one video level to another at the sampling interval in accordance with the voltage on the integrating capacitor $C_1$ during the sampling interval.

Similarly to the output appearing across the integrating capacitor $C_2$ is applied to a second video channel comprising differential amplifier 163 and a sample and hole circuit to provide a second video output. The sample and hold circuit includes a transistor 164 having a drain 165, a source 166 and a gate 167 and a capacitor $C_4$. The source to drain current flow path of the transistor 164 is connected between the output of the amplifier 163 and one terminal 168 of the capacitor $C_4$, the other electrode of which is connected to ground. The gate 167 is connected to the sample pulse generator 158. During the sampling intervals of pulses 160 the transistor 164 is turned on so as to permit capacitor $C_4$ to charge in turn to a voltage corresponding to the second levels of the pulses of FIG. 8N. Accordingly, a second video signal 169 such as shown in FIG. 80 is obtained at terminal 168 in which the signal shifts from one video level to another at the sampling interval in accordance with the voltage on the integrating capacitor $C_4$ during the sampling interval.

The video outputs appearing at terminals 157 and 168 of the first and second video channels may be separately processed and utilized or may be multiplexed to form a composite video signal.

Figure 8Q:
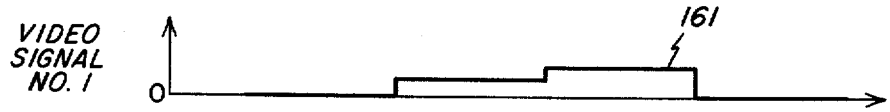
Figure 8R:
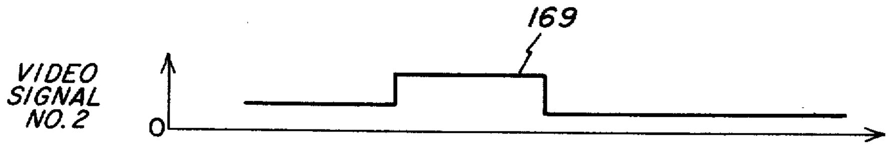
Figure 8S:
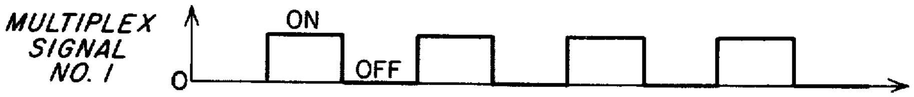
Figure 8T:
Figure 8U:
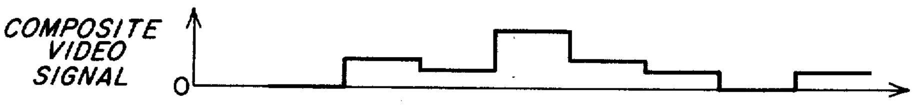

The first and second video signals obtained at terminals 157 and 168 are multiplexed by multiplex circuit 170 to obtain a composite video signal and amplified by amplifier 171. The multiplex circuit includes a pair of transistors 172 and 173 and a multiplex pulse generator 174. The source of drain current flow path of transistor 172 is connected between terminal 157 and the input of amplifier 171 and the source to drain current flow path of transistor 174 is connected between terminal 168 and the input of amplifier 171. The multiplex pulse generator 174 controlled by block 126 develops the multiplexing pulses shown in FIGS. 8S and 8T. The pulses of FIG. 8S are applied to the gate electrode of transistor 172 and the pulses of FIG. 8T are applied to the gate electrode of transistor 174. When one of multiplexing pulse signals gates transistor 172 on as shown in FIG. 8S, a segment of video signal of FIG. 8Q appears at the input of amplifier 171. Similarly when the other of the multiplexing signals gates transistor 174 on as shown in FIG. 8T, a segment of video signals of FIG. 8R appears at the input of amplifier 171. The composite signal resulting from the multiplexing of video signal No. 1 and video signal No. 2 appears in FIG. 8U.

It is readily apparent that if three separate video outputs are desired from the apparatus of FIG. 7, the column conductor lines would be arranged into consecutive sets in which each set would include three consecutively numbered conductor lines. In this case, a third integrating capacitor would be provided and a third video channel would be provided. Other changes necessary in the system are readily apparent from the description of the two-channel system. Similarly, the larger number of channels may be provided, if desired. Also, it is also readily apparent that a single integrating capacitance may be utilized for sensing the current flow of each of the drive lines, if desired.

One advantage of the apparatus described in FIG. 7 is that the substrate is maintained at a fixed potential or grounded. This enables auxiliary circuits and elements such as the row shift register and column shift register to be formed on the same substrate of semiconductor material as the securing elements of the array and operated without requiring further isolation to eliminate noise, cross talk, or parasitic capacitance. In the specific arrangement described in the aforementioned patent application Ser. No. 264,804 in which the substrate is periodically ungrounded or floated for the purpose of sensing charge stored at a particular storage site, photon generated currents flowing to other sites or devices during the floating period for read out of a particular device introduce undesired cross talk into the signal of the particular device being sensed. In the arrangement of FIG. 7 photon generated charging current of only the column of devices being addressed is introduced into the signal of the site or device being sensed. A particular advantage of sensing current in the drive line due to charge injection is that the stray capacitance of all of the other drive lines is eliminated from the sensing circuit and accordingly the integrating capacitance may be made by small enough, particularly where large arrays of devices are utilized, to provide desired signal amplitude. Drive line sensing also makes it possible to arrange the drive lines of the array into a plurality of consecutively numbered sets, each set having the same number of consecutively numbered lines and address simultaneously the devices of a set in a particular row. Thus a plurality of outputs may be obtained correspondingly to the number of lines in a set. The outputs may be multiplexed to obtain a composite output. With this arrangement, the size of array, that is the number of devices included therein, may be substantially increased without the increasing rate of address of a single site.

The apparatus of FIG. 7 may be readily utilized for providing a plurality of interlaced video signals each representing a different color field. The additions that would be made to the apparatus for this mode of operation would include a first color filter adapted to pass radiation representing color, for example cyan, placed over all of the devices connected to the number one column lines of all of the sets, and placing a second filter adapted to pass radiation representing another color, for example red, over all of the devices of the array connected to the second numbered column lines of all of the sets of the array. The filters may be mechanical affixed to the array 50 of FIG. 3 or formed thereon by techniques well known to those skilled in the art. For example, selective wave length interference filters may be formed by thin film techniques where multiple layers of suitable thickness and dielectric constant are deposited onto a substrate. For the present purpose such layers may be deposited directly onto the wafer through an aperture mask which defines the physical extent of each filter. The location of the corners of the first filter on the devices connected to $Y_1$ column line is indicated by points $a_1$, $b_1$, $c_1$ and $d_1$ and the location of the corners of the second filter on the devices connected to the $Y_2$ column line indicated by points $a_2$, $b_2$, $c_2$ and $d_2$. The filters would be similarly affixed over devices connected to $Y_3$ and $Y_4$ column conductor lines. The filters of course could be filters for passing the invisible as well as visible bands of radiation.

For a three color system the column lines of the array would be organized into sets each having three column lines. A first color filter adapted to pass radiation corresponding to one color, for example red, would be placed over all the devices connected to the first numbered column lines of all of the sets, a second filter adapted to pass radiation corresponding to another color, for example green, would be placed over all of the devices of the array connected to the second numbered column lines of all of the sets, and a third filter adapted to pass radiation corresponding to a third color, for example blue, would be placed over all of the devices of the array connected to the third numbered column lines of all of the sets.

While a mode of operation of the apparatus of FIG. 7 has been described in which the column lines of a set are simultaneously driven to cause injection of charge of the devices controlled thereby, it will be understood that the column lines of a set may be driven in sequence as well. For example, in a three color system in which three column lines are provided in each set, the number one column lines of the sets would be addressed for read out during the first field of scan, the number two lines of the sets would be addressed for read out during the second field of scan, and the number three lines of the sets would be addressed for read out during the third field of scan. The three video signals so obtained when applied to a suitable display device would provide an interlace pattern in the reproduced color image.

Figure 9:
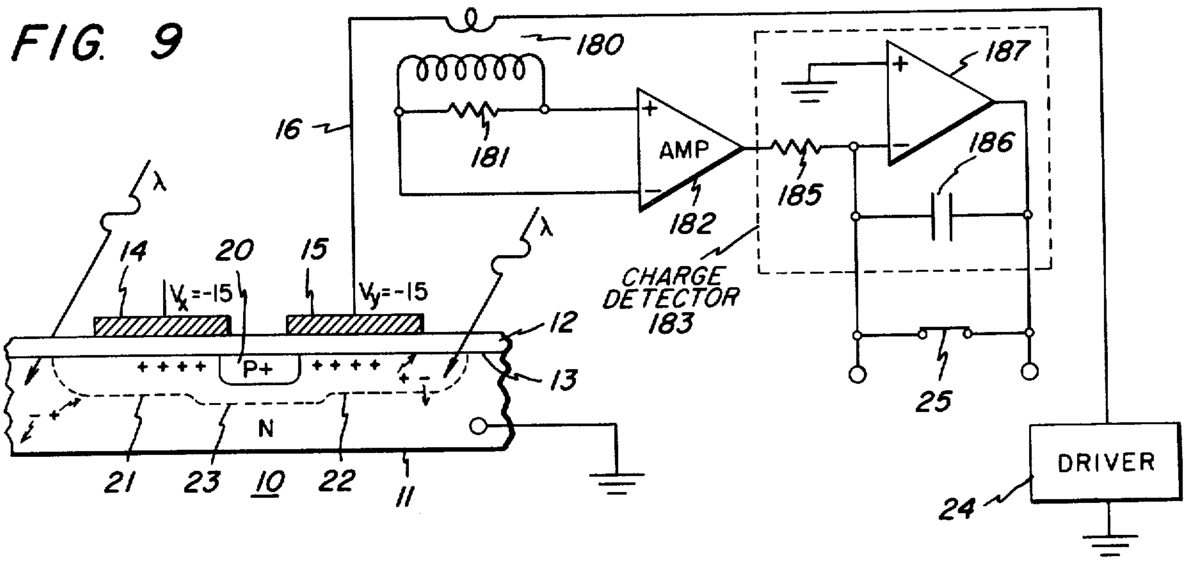
FIG. 9 shows a diagram of a radiation sensing device connected in another circuit in accordance with the present invention.
Figure 10A:
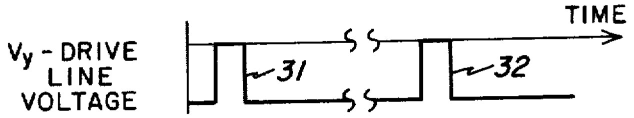
FIGS. 10A–10C are graphs of various voltages and current signals appearing in the diagrams of FIG. 9 useful in explaining the operation thereto.
Figure 10B:
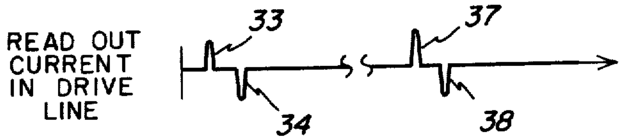
Figure 10C:
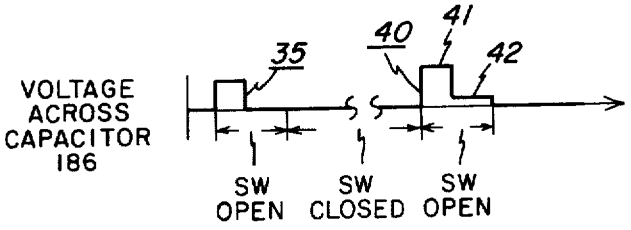

Reference is now made to FIG. 9 which shows another mode of integrating the current flow in the drive line of the device of FIG. 1A. The elements of the device and circuit of FIG. 9 identical to the elements and circuit elements of the device of FIG. 1A are identically designated. In this figure a current transformer 180 is provided, the primary winding of which is connected between the plate 15 and the driver 24. A high resistance 181 is provided across the secondary winding of the transformer. A charge detector is provided which includes a conventional high impedance amplifier 182 and a conventional integrator circuit 183. The integrator circuit includes a resistor 185 and a capacitor 186 connected in series and a conventional operational amplifier 187 connected across the capacitor. A reset switch 25 is connected across the output capacitor 186. The sequence of operations depicted in FIGS. 1A through 1D for the sensing circuit disclosed therein is identical to the sequence of operation for the circuit of FIG. 9 and may best be understood by referring to the waveform diagrams of FIGS. 10A–10C which are identical in form to waveform diagrams of FIGS. 2A–2C, respectively. FIG. 10A shows the waveform of the output of the driver 24. FIG. 10B shows the waveform of the current flow in the primary winding of the transformer 180. FIG. 10C shows the waveform of the voltage across the capacitor 186 of integrator 183. Of course, FIGS. 10A–10C depict the operation for the same two conditions of charge storage in the device as in FIGS. 1A–1C, i.e. one in which no radiation produced charge has been stored and the other in which radiation produced charge has been stored. The essential difference between the circuits of FIG. 1A and FIG. 9 is that in place of the integrating capacitance being located in the drive line in the sensing operation, a current transformer is provided and drive voltage is directly applied to the drive line 16.

Figure 11:
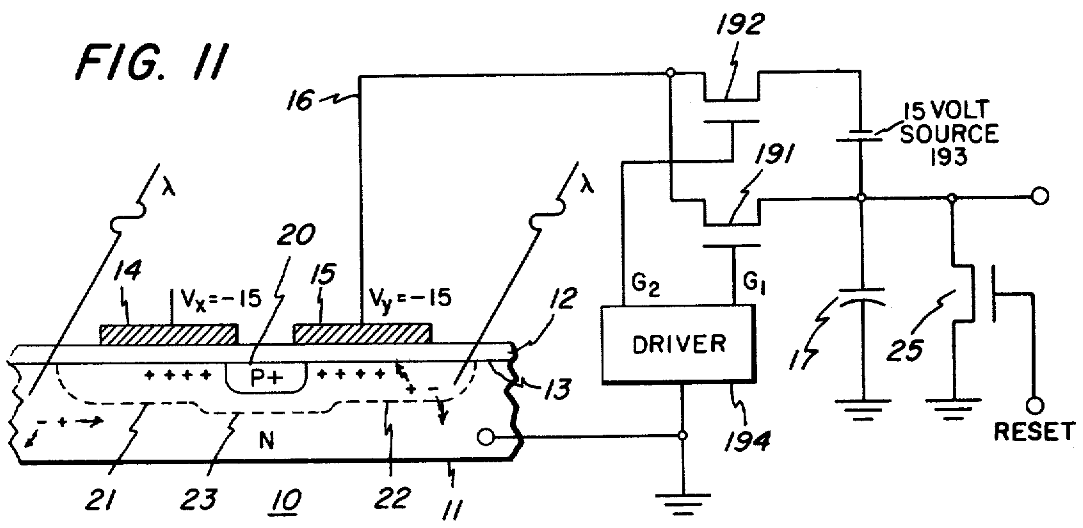
FIG. 11 shows a diagram of a radiation sensing device connected in still another circuit in accordance with the present invention.

Referring now to FIG. 11 there is shown another mode of obtaining readout of the charge stored in the device 10. The elements of the device and circuit of FIG. 11 which are identical to the elements and circuit of FIG. 1A are identically designated. The essential difference in the circuit of FIG. 11 over the circuit of FIG. 1A is that one terminal of the integrating capacitance 17 is grounded thereby avoiding the need of a differential amplifier for amplifying the video signal obtained across the integrating capacitance. In this circuit, the drive line 16 is connected through a first gating transistor 191 to one terminal of the integrating capacitor 17, the other terminal of which is grounded. The drive line 16 is also connected through a second gating transistor 192 to the negative terminal of a 15 volt source 193, the positive terminal of which is connected to the ungrounded terminal of the integrating capacitor 17. Driver 194 furnishes two drive outputs designated $G_1$ and $G_2$. Output $G_1$ actuates the gate of the first transistor 191, and the output $G_2$ actuates the gate of the second transistor 192. The reset switch 25 is connected in shunt across the capacitor 17. Output is obtained between the ungrounded terminal of the capacitor 17 and ground.

Figure 12A:
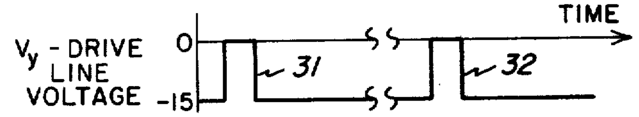
FIGS. 12A–12E are graphs of various signals appearing in the diagrams of FIG. 11 useful in explaining the operation thereof.
Figure 12B:
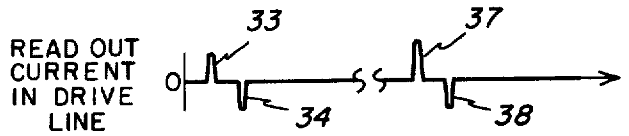
Figure 12C:
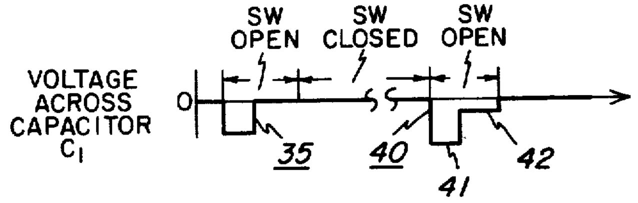
Figure 12D:
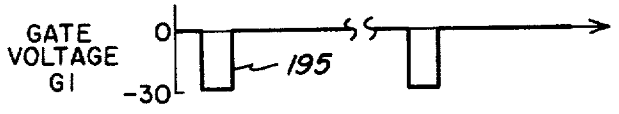
Figure 12E:
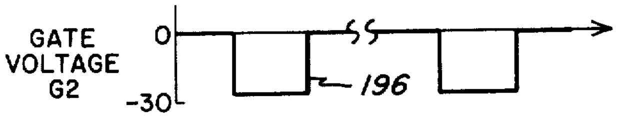

The operation of the device and circuit of FIG. 11 will be explained in connection with FIGS. 12A, 12B, 12C, 12D and 12E. FIG. 12A represents the voltage appearing on the drive line 16 or plate 15 and is identical to the waveform shown in FIG. 2A. FIG. 12B represents the readout current flow in the drive line 16 and is identical in form to the readout current shown in connection with FIG. 2B. FIG. 12C represents the voltage appearing across the integrating capacitor 17 and except for polarity is identical in form to voltage waveform of FIG. 2C. FIG. 12D shows waveform diagram of the gating voltage $G_1$ applied to the gate of the first switching transistor 191. FIG. 12E shows the waveform of voltage $G_2$ applied to the gate of the second transistor 192. As in connection with FIGS. 2A through 2C, two cycles of operation of the device are depicted, one in which no charge is stored in the device and in the other case in which charge is stored in the device. Portions of the diagrams of FIGS. 12A through 12C identical to the portions of the diagrams of FIGS. 2A through 2C are identically designated.

To obtain a readout of charge stored in the depletion region 22, initially the gating pulse 195 of FIG. 12D is applied to the gate electrode of the switching transistor 191 to essentially ground the drive line 16 and the plate 15 and cause a pulse of current to flow into the integrating capacitor 17. Drive line 16 is returned to −15 volts or storage volt level by return of gate voltage on the switching transistor 191 to zero and by applying a gating pulse 196 to the second switching transistor 192 as shown in FIG. 12E. These two switching actions switches the 15 volt source 193 onto the line 16 in series with the small voltage appearing on the integrating capacitance 17. As shown, the second switching transistor is maintained on by pulse 196 beyond the point at which the reset switch is closed in order to set the level of the drive line 16 and plate 15 to precisely 15 volts. The effect of such switching operations produces the waveform shown in FIG. 12C. The mode of charge sensing described in connection with FIGS. 9 and 11 may be readily incorporated in the apparatus shown in FIG. 7.

While the invention has been described in connection with an array constituted of an N-type conductivity substrate, a P-type conductivity substrate could as well be used. Of course, in such a case the applied potentials would be reversed in polarity and the current flows would be reversed in direction.

While the invention has been described with the signal generated by all of the stored charge being injected into the bulk of the semiconductor at a fixed or ground potential, the signal may be derived from the injection of only a portion of the charge. In addition, it is not necessary for the charge to be injected into the bulk for recombination therein, but only that the signal charge be removed from the cell so that it is not recollected upon reestablishment of the cell potential.

While the invention has been described in specific embodiments, it will be appreciated that modifications, such as those described above, may be made by those skilled in the art, and it is intended by the appended claims to cover all such modifications and changes as fall within the true spirit and scope of the invention.

What we claim as new and desire to secure by Letters Patent of the United States is:

1. A radiation sensing device comprising
   - a substrate of semiconductor material of one conductivity type having a major surface,
   - a conducting member overlying a portion of a region of said substrate adjacent said major surface and in insulating relationship therewith,
   - a voltage means connected in circuit between said conducting member and said substrate for providing a voltage of one value between said conducting member and said substrate to deplete said portion of majority charge carriers,
   - said substrate being maintained at a fixed potential in relation to said one value of voltage,
   - means for exposing said substrate to radiation whereby minority carriers generated in said portion are stored therein,
   - means for collapsing said voltage to another value for an interval of time to inject said stored carriers into said substrate and thereafter reestablishing substantially said one value of voltage,
   - circuit means connected between said conducting member and said substrate,
   - whereby charge stored in said portion is driven out of said portion into said substrate and a current is caused to flow in said circuit means,
   - said circuit means including means to provide a signal which is the integral of said current flow.

2. The device of claim 1 in which said circuit means includes an integrating capacitor connected between said conducting member and said voltage means.

3. The device of claim 1 in which said circuit means includes an integrating capacitor having one electrode connected to said substrate and another electrode connected to said voltage means.

4. The device of claim 3 in which said voltage means includes a voltage source of said one value having one terminal connected to said another electrode of said integrating capacitor and to said conducting member through a first switching means and having another terminal connected to said conducting member through a second switching means, means for rendering said first switching means conductive when said conducting member is lowered in voltage to said other value and nonconductive thereafter, and for rendering said second switching means conductive to connect said source of voltage in circuit to return said conducting member to substantially said one value of voltage.

5. The combination of claim 1 in which said circuit means includes a current transformer the primary of which is included in said current flow circuit.

6. In combination, a substrate of semiconductor material of one conductivity type having a major surface, a plurality of first conductive plates, each overlying and in insulated relationship to said major surface and forming a first conductor-insulator-semiconductor capacitor with said substrate, a plurality of second conductive plates, each adjacent a respective first conductive plate to form a plurality of pairs of plates, said pairs of plates being arranged in a matrix of rows and columns, each of said second conductive plates overlying and in insulated relationship to said major surface and forming a second conductor-insulator-semiconductor capacitor with said substrate, each coupled to a respective first conductor-insulator-semiconductor capacitor, a plurality of column conductor lines, the second conductive plates in each of said columns connected to a respective column conductor line, a plurality of row conductor lines, the first conductive plates in each of said rows connected to a respective row conductor line, a first voltage means for providing a first voltage between said row conductor lines and said substrate to deplete respective first portions of said substrate lying thereunder of majority charge carriers, a second voltage means connected in circuit between said column conductor lines and said substrate for providing a second voltage between said column conductor lines and said substrate to deplete respective second portions of said substrate lying thereunder of majority charge carriers, said substrate maintained at a fixed potential in relation to said second voltage means, means for exposing said substrate to radiation whereby charge is stored in said first and second portions of said substrate, first means for collapsing and reestablishing said first voltage on each of said row conductor lines in sequence during a respective first period of time, second means for collapsing and reestablishing said second voltage on each of said column conductor lines in sequence during a respective second period of time shorter than said first period of time, each of said second periods included within said first period, circuit means connected between each of said column conductor lines in sequence and said substrate during a respective second period, whereby charge stored in each of said second semiconductor capacitors is driven out of said respective second capacitors in sequence into said substrate and a respective current is caused to flow in said circuit means, said circuit means including means providing successive outputs, each representing an integral of a respective current flow.

7. The combination of claim 6 in which said circuit means includes an integrating capacitor connected between said conducting member and said voltage means.

8. The combination of claim 6 in which said circuit means includes a current transformer in said current flow circuit.

9. The combination of claim 6 in which is provided means for successively sampling said outputs to provide an electrical output varying in time in accordance with the variation in amplitude of said samples.

10. In combination, a substrate of semiconductor material of one conductivity type having a major surface, a plurality of said conductive plates, each overlying and in insulated relationship to said major surface and forming a first conductor-insulator-semiconductor capacitor with said substrate, a plurality of second conductive plates, each adjacent a respective first conductive plate to form a plurality of pairs of plates, said pairs of plates being arranged in a matrix of rows and columns, each of said second conductive plates overlying and in insulated relationship to said major surface and forming a second conductor-insulator-semiconductor capacitor with said substrate, each coupled to a respective first conductor-insulator-semiconductor capacitor, a plurality of column conductor lines, the second conductive plates in each of said columns connected to a respective column conductor line, the column conductor lines arranged into a plurality of consecutively numbered sets, each set including the same number of consecutively number lines, a plurality of consecutively numbered terminals equal in number to the number of column lines in a set, each column line of a set connected through a respective column switch to a correspondingly numbered terminal, a plurality of row conductor lines, the first conductive plates in each of said rows connected to a respective row conductor line, a first voltage means for providing a first voltage between said row conductor lines and said substrate to deplete respective first portions of said substrate lying thereunder of majority charge carriers, a second voltage means connected in circuit between each set of said column conductor lines and said substrate for providing a second voltage between said column conductor lines and said substrate to deplete respective second portions of said substrate lying thereunder of majority charge carriers, said substrate maintained at a fixed potential in relation to said second voltage means, means for exposing said substrate to radiation whereby charge is stored in said first and second portions of said substrate, first means for collapsing and reestablishing said first voltage on each of said row conductor lines in sequence during a respective first period of time, means for actuating the column switches of each set during a respective second period of time whereby the column lines of each set are connected in turn to said terminals, a plurality of circuit means each connected between a respective terminal and said second voltage means, second means for collapsing and reestablishing said second voltage on said terminals during said second periods of time, whereby charge stored in the second semiconductor capacitors of each set is simultaneously driven out of said respective second capacitors into said substrate and currents are caused to flow simultaneously in each of said circuit means, each of said circuit means including means for integrating each of said current flows with respect to time to provide a respective output of sequentially occurring levels of voltage.

11. The combination of claim 10 in which is provided means for successively sampling the levels of each of said outputs to provide a respective video signal varying in time in accordance with the variation in amplitude of the samples thereof.

12. The combination of claim 11 in which is provided means for multiplexing said outputs to provide a composite output.

13. The combination of claim 10 in which each of said sets of column lines consists of two column lines.

14. The combination of claim 10 in which each of said sets of column lines consists of three column lines.

15. The combination of calim 13 in which the first and second semiconductor capacitors of the odd numbered columns are adapted to receive radiation in one band of wavelengths and in which the even numbered columns of first and second semiconductor capacitors are adapted to received radiation in another band of wavelength.

16. The combination of claim 14 in which the first and second semiconductor capacitors associated with the first column line of each set are provided with first filters which pass radiation in a first band of wavelengths, in which the first and second semiconductor capacitors associated with the second column line of each set are provided with second filters which pass radiation in a second band of wavelengths, and in which the first and second semiconductors capacitors associated with the third column line of each set are provided with third filters which pass radiation in a third band of wavelengths.

17. The combination of claim 16 in which said first, second and third filters are filters each of which passes wavelengths of light corresponding to a respective one of the three primary colors of red, green and blue.

* * * * *